(12) United States Patent
Thomas et al.

(10) Patent No.: US 11,203,904 B2
(45) Date of Patent: Dec. 21, 2021

(54) FIXED-CUTTER MATRIX BITS WITH REPAIRABLE GAUGE PADS

(71) Applicant: Halliburton Energy Services, Inc., Houston, TX (US)

(72) Inventors: Jeffrey G. Thomas, Magnolia, TX (US); Matthew S. Farny, Magnolia, TX (US); Travis Samuel Mixon, The Woodlands, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/331,917

(22) PCT Filed: Dec. 21, 2016

(86) PCT No.: PCT/US2016/068039
§ 371 (c)(1),
(2) Date: Mar. 8, 2019

(87) PCT Pub. No.: WO2018/118043
PCT Pub. Date: Jun. 28, 2018

(65) Prior Publication Data
US 2020/0024904 A1    Jan. 23, 2020

(51) Int. Cl.
*E21B 10/54* (2006.01)
*E21B 10/573* (2006.01)
(Continued)

(52) U.S. Cl.
CPC ............ *E21B 10/54* (2013.01); *E21B 10/573* (2013.01); *E21B 17/1085* (2013.01);
(Continued)

(58) Field of Classification Search
CPC ... E21B 17/1085; E21B 17/1092; E21B 10/54
See application file for complete search history.

(56) References Cited

U.S. PATENT DOCUMENTS

| 5,755,298 A | 5/1998 | Langford, Jr. et al. |
| 6,349,788 B1 | 2/2002 | Beuershausen |

(Continued)

OTHER PUBLICATIONS

International Search Report & Written Opinion issued for corresponding International Application No. PCT/US2016/068039 dated Aug. 25, 2017 (13 pages).

*Primary Examiner* — Catherine Loikith
(74) *Attorney, Agent, or Firm* — McGuireWoods LLP

(57) ABSTRACT

Fixed-cutter matrix bits comprising hardfaced elements on the gauge pads, and methods of manufacture and using. An example fixed-cutter matrix bit comprises a matrix bit body, a plurality of cutter elements secured at fixed locations to the matrix bit body, and a plurality of gauge pads disposed on the matrix bit body; wherein at least one of the gauge pads includes a hardfaced exterior surface. The hardfaced exterior surface may comprise a material selected from the group consisting of tungsten, niobium, vanadium, molybdenum, silicon, titanium, tantalum, zirconium, chromium, yttrium, boron, carbon, carbides thereof, nitrides thereof, borides thereof, oxides thereof, silicides thereof, and combinations thereof. The hardfaced exterior surface may be fused to the at least one gauge pad during the infiltration process of manufacturing the matrix bit body.

20 Claims, 8 Drawing Sheets

(51) Int. Cl.
 *E21B 17/10* (2006.01)
 *B23K 35/02* (2006.01)
 *B23K 35/30* (2006.01)
 *E21B 10/43* (2006.01)
 *E21B 10/60* (2006.01)

(52) U.S. Cl.
 CPC ...... *B23K 35/0266* (2013.01); *B23K 35/3033* (2013.01); *E21B 10/43* (2013.01); *E21B 10/602* (2013.01)

(56) References Cited

U.S. PATENT DOCUMENTS

| | | | |
|---|---|---|---|
| 6,541,115 B2 * | 4/2003 | Pender | C04B 41/009 407/119 |
| 7,216,565 B2 | 5/2007 | Sherwood et al. | |
| 8,336,649 B2 * | 12/2012 | Jones | E21B 10/55 175/413 |
| 8,439,136 B2 * | 5/2013 | Jones | E21B 10/55 175/431 |
| 8,776,341 B2 | 7/2014 | Overstreet et al. | |
| 9,133,667 B2 * | 9/2015 | Jones | E21B 10/43 |
| 2008/0283305 A1 | 11/2008 | Overstreet et al. | |
| 2010/0101866 A1 | 4/2010 | Bird | |
| 2010/0193254 A1 | 8/2010 | Lind et al. | |

* cited by examiner

FIXED-CUTTER MATRIX BITS WITH REPAIRABLE GAUGE PADS

TECHNICAL FIELD

The present disclosure generally relates to fixed-cutter matrix drill bit, and more particularly, to manufacturing and using fixed-cutter matrix bits having repairable gauge pads.

BACKGROUND

Fixed-cutter matrix bits are drill bits that generally comprise fixed-cutters, i.e., the cutters are secured to the bit body at fixed positions; and the bits potentially have no moving parts. Fixed-cutter bits commonly use a matrix bit body. Typically, a mold is used to manufacture the matrix bit body. The mold is loaded with a matrix powder material which may comprise a tungsten carbide powder or a similar powder material. The matrix powder material is then metallurgically bonded with a metallic binder, for example, a copper alloy, during an infiltration process in the mold to form the matrix composite material that forms the matrix bit body. Fixed-cutter matrix bits may be more resistant to abrasion and erosion relative to steel bits but may also possess lower resistance to impact forces relative to steel bits. After the matrix bit body has been formed, the manufacture of the fixed-cutter matrix bit may proceed with the addition of the cutter elements and any remaining processes to finish the bit.

Fixed-cutter matrix bits comprise gauge pads to maintain the diameter of the wellbore during drilling. The gauge pads may comprise preformed reinforcing elements, which commonly include thermally stable polycrystalline diamond (hereafter "TSP"). TSP elements may provide favorable wear-resistance to the contact surface of the gauge pads due to their considerable hardness. However, if these gauge pads become damaged, such as due to impact force, the gauge pads are typically not repairable due to their hardness. If the gauge pads cannot be repaired, it is common practice to scrap the matrix bit.

BRIEF DESCRIPTION OF THE DRAWINGS

Illustrative examples of the present disclosure are described in detail below with reference to the attached drawing figures, which are incorporated by reference herein, and wherein.

The illustrated figures are only exemplary and are not intended to assert or imply any limitation with regard to the environment, architecture, design, or process in which different examples may be implemented.

DETAILED DESCRIPTION

Aspects of the present disclosure include drill bits and corresponding drill bit manufacturing methods that can improve the life of a fixed-cutter matrix drill bit by virtue of a gauge pad with a hardfaced exterior surface. Other aspects of the disclosure include manufacturing and using fixed-cutter matrix bits having repairable gauge pads with a hardfaced exterior surface.

The gauge pad may avoid the use of TSP elements or analogous reinforcing elements that might be technically incompatible or impractical for use with the hardfaced exterior surfaces described herein. In one example, the fixed-cutter matrix bit may be manufactured using a process that places the preformed hardfacing element in the mold with the matrix powder material prior to initiation of the infiltration process. Alternatively, the hard-faced exterior surface may be added to the fixed-cutter matrix bit after the matrix bit body has been manufactured. If the hard-faced exterior surface is damaged, the hard-faced exterior surface may be repaired through various repair techniques, including hardfacing onto the hard-faced exterior surface. Examples of the present disclosure and its advantages may be understood by referring to FIGS. 1 through 9, where like numbers are used to indicate like and corresponding parts.

Figure 1:
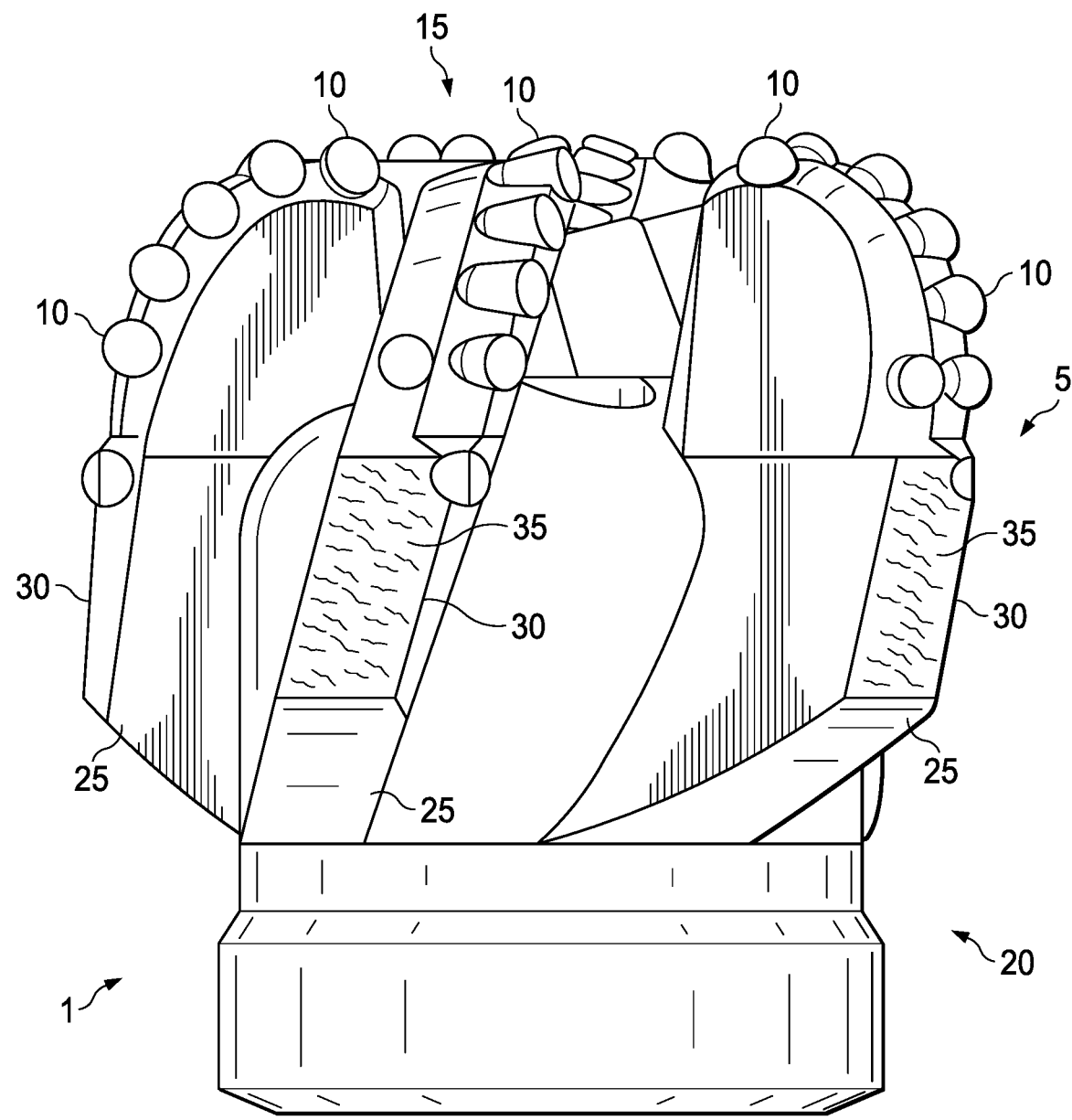
FIG. 1 is an elevation view of a fixed-cutter matrix bit with hardfaced gauge pads in accordance with certain examples of the present disclosure.

FIG. 1 is an elevation view of a fixed-cutter matrix bit, generally indicated at 1, that may be suitably configured according to various aspects of the present disclosure. The fixed-cutter matrix bit 1 comprises a matrix bit body, generally indicated at 5, formed from a matrix composite material. A series of cutter elements 10 that may comprise polycrystalline diamond are added at fixed positions to the matrix bit body 5 to form the fixed-cutter matrix bit 1. The fixed-cutter matrix bit 1 has a bit face, generally 15, at one end and a coupling section, generally 20, at its opposite end. The coupling section 20 may be used to couple the fixed-cutter matrix bit 1 to a corresponding coupling section of a drill string (not illustrated). The fixed-cutter matrix bit 1 extends axially along an axis A-A and further comprises blades 25. The fixed-cutter matrix bit 1 further comprises gauge pads 30. The gauge pads 30 comprise a hardfaced exterior surface 35. The gauge pads 30 may be positioned at the outer radial extremities of the fixed-cutter matrix bit 1 and may be used to determine the wellbore diameter drilled by the fixed-cutter matrix bit 1.

The hardfaced exterior surface 35 of the gauge pads 30 contacts the subterranean formation that the wellbore penetrates. The hardfaced exterior surface 35 added to the gauge pads 30 may be a hardfacing composite material comprising a reinforcing agent, a binding agent, and optionally a fluxing agent. The hardfacing composite material may be provided in a variety of sizes and geometries for placement into a mold or for direct application onto the gauge pads 30 of the fixed-cutter matrix bit 1. Examples of the geometries include, but are not limited to, sinter rods, tube rods, ropes, or as loose particulate powders. One of ordinary skill in the art will recognize the appropriate size and geometry of the hardfacing composite material needed for a particular application.

Examples of the reinforcing agent include, but are not limited to, tungsten, niobium, vanadium, molybdenum, silicon, titanium, tantalum, zirconium, chromium, yttrium, boron, carbon, carbides thereof, nitrides thereof, borides thereof, oxides thereof, silicides thereof, and combinations thereof. In some examples, diamond particles may be dispersed within the reinforcing agent. If the reinforcing agent is provided as a powder, several types of powders or powder sources may be used including, but not limited to macrocrystalline powders, crushed cast powders, spherical cast powders, and combinations thereof. In alternative examples, pellets of the reinforcing material may be used. The pellets may be formed by cementing, sintering, and/or HIP-sintering fine grains of a reinforcing material with an optimum weight percentage of the binding agent. The size of the pellets may range from about 5 microns to about 1500 microns. In some examples, a blend of types and sizes of reinforcement materials may be used.

Examples of binding agents may include, but are not limited to, copper, cobalt, nickel, boron, molybdenum, niobium, chromium, iron, alloys thereof, and combinations thereof. The binding agent may be used to form the matrix portion of the hardfacing composite material. The weight ratio of the reinforcing agent to the binding agent may be about 1:1 to about 1:4.

In some optional examples, the binding agent may further comprise a fluxing agent. Examples of fluxing agents may include, but are not limited to, chromium silicates, boron silicates, and combinations thereof.

Figure 2:
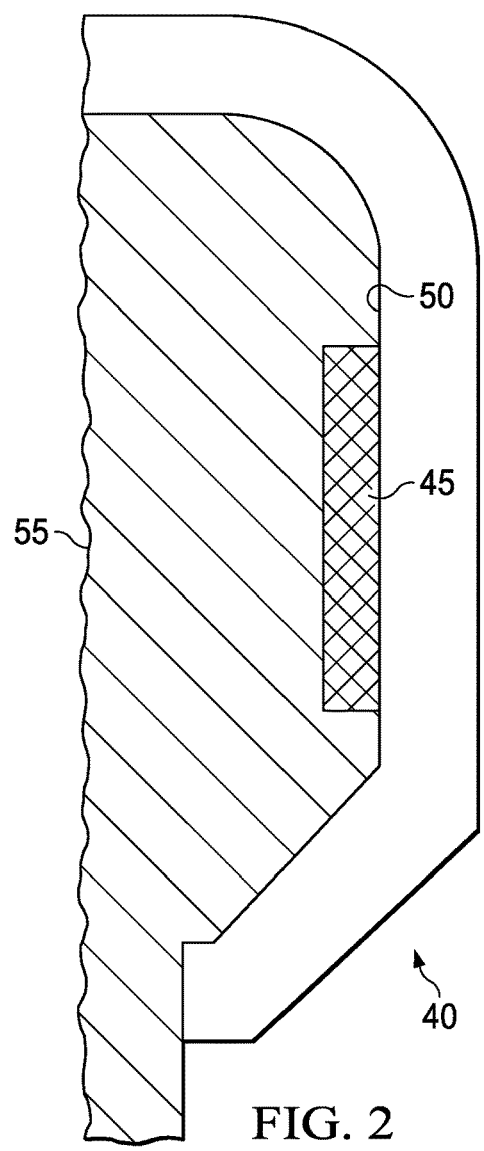
FIG. 2 is a cross-sectional view of a mold comprising a preformed hardfacing element and is usable to manufacture a matrix bit body which may be used to form the fixed-cutter matrix bit illustrated in FIG. 1 in accordance with certain examples of the present disclosure.

FIG. 2 is a cross-sectional view of a mold 40 comprising a preformed hardfacing element 45. The mold 40 is usable to manufacture a matrix bit body (e.g., matrix bit body 5 as illustrated in FIG. 1) which may then be used to form the fixed-cutter matrix bit 1 illustrated in FIG. 1. The illustrated cross-sectional portion of the mold 40 corresponds generally to the portion of the fixed-cutter matrix bit where a blade may be formed (e.g., a blade 25 as illustrated in FIG. 1). A preformed hardfacing element 45 is placed into the mold 40 at the portion of the mold 40 corresponding to where the gauge pad (e.g., gauge pad 30 as illustrated in FIG. 1) is to be positioned on the blade. The preformed hardfacing element 45 may be adhered to a positioning insert placed against the interior surface 50 of the mold 40 or may be adhered directly to the interior surface 50 of the mold 40. If a positioning insert is used, the positioning insert may comprise graphite, sand, or a similar material that does not fuse to the preformed hardfacing element 45. In some examples, the positioning insert may be formed directly into the mold. The matrix powder material 55, which may be a tungsten carbide powder, is then placed into the mold 40 as is done typically when manufacturing a matrix bit body. During the subsequent infiltration process, the molten infiltration binder may then be used to fuse the preformed hardfacing element 45 to the matrix composite material (i.e., the infiltrated matrix powder material 55) which forms the matrix bit body. The completed matrix bit body comprising gauge pads with hardfaced exterior surfaces (e.g., hardfaced exterior surfaces 35 as illustrated in FIG. 1) may then be removed from mold 40.

With continued reference to FIG. 2, the preformed hardfacing element 45 may be any shape and dimension sufficient for placement into the mold 40 and for providing a gauge to the fixed-cutter matrix bit of the desired diameter. In some examples, the preformed hardfacing element 45 may comprise rods or tubes of suitable length. The shape of the performed hardfacing element 45 may be of a corresponding shape to a recessed area in the fixed-cutter matrix bit such that it is fully encapsulated within the gauge pad (e.g., gauge pad 30 as illustrated in FIG. 1) or extends to the front and back of the surfaces of the blade (e.g., blade 25 as illustrated in FIG. 1) such that it forms the corners of the blades. It is to be understood that the hardfaced exterior surfaces formed from the preformed hardfacing element 45 may be modified as desired after the matrix bit body has been manufactured. Such modification may be performed to adjust the dimensions of the gauge of the fixed-cutter matrix bit. For example, the hardfaced exterior surfaces may be grinded or machined to a desired dimension to provide a wellbore of desired diameter.

Figure 3:
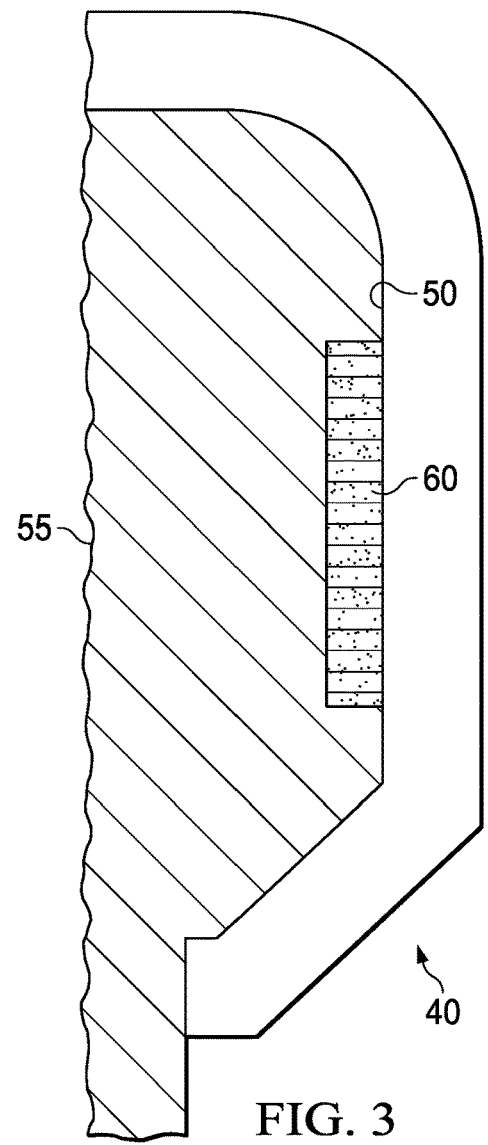
FIG. 3 is a cross-sectional view of a mold comprising a displacement insert and is usable to manufacture a matrix bit body which may be used to form the fixed-cutter matrix bit illustrated in FIG. 1 in accordance with certain examples of the present disclosure.

FIG. 3 is a cross-sectional view of a mold 40 comprising a displacement insert 60. The mold 40 is usable to manufacture a matrix bit body (e.g., matrix bit body 5 as illustrated in FIG. 1) which may then be used to form the fixed-cutter matrix bit 1 illustrated in FIG. 1. As compared to FIG. 2, the mold 40 does not comprise a preformed hardfacing element (e.g., preformed hardfacing element 45 as illustrated in FIG. 2) but instead comprises a displacement insert 60 positioned at the portion of the mold 40 corresponding to where the gauge pad (e.g., gauge pad 30 as illustrated in FIG. 1) is to be positioned on the blade (e.g., a blade 25 as illustrated in FIG. 1). The displacement insert 60 may comprise graphite or other such material (e.g., sand, quartz, etc.) which does not fuse to the matrix powder material 55. The displacement insert 60 may be affixed to the mold 40 using adhesive or any other sufficient material. In some examples, the displacement insert 60 may be integral with the mold, for example, through machining. With the displacement insert 60 in place, the matrix powder material 55 may then be placed into the mold 40 as illustrated to manufacture the matrix bit body. The matrix bit body may then be formed during the subsequent infiltration process as described above. The completed matrix bit body may then be removed from mold 40 and separated from the displacement insert 60 to expose a recessed area in the matrix bit body where the displacement insert 60 was positioned in the mold 40.

Figure 4:
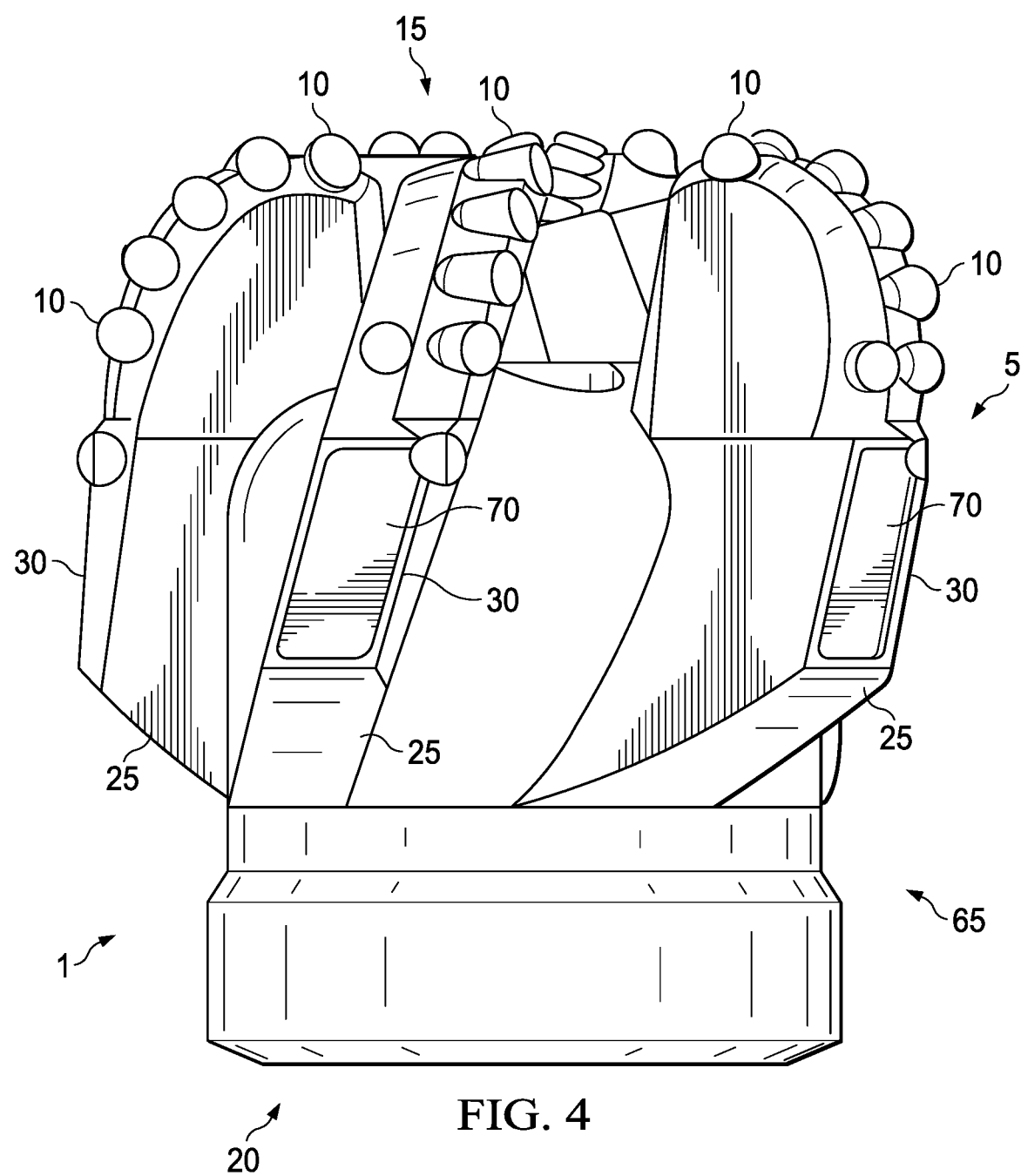
FIG. 4 is an elevation view of a fixed-cutter matrix bit comprising recessed areas on the gauge pads in accordance with certain examples of the present disclosure.

FIG. 4 is an elevation view of a fixed-cutter matrix bit 65 comprising recessed areas 70 on the gauge pads 30. The fixed-cutter matrix bit 65 is similar to the fixed-cutter matrix bit 1 illustrated in FIG. 1 and includes matrix bit body 5, cutter elements 10, bit face 15, coupling section 20, blades 25, and gauge pads 30. However, fixed-cutter matrix bit 65 comprises a recessed area 70 on the gauge pads 30. Recessed area 70 is an area with a recessed surface on the exterior surface of a gauge pad 30. Recessed area 70 is formed in the matrix bit body 5 by the displacement insert 60 as discussed above. In some examples, recessed area 70 may have well-defined corners and/or edges. In alternative examples, recessed area 70 may not have well-defined corners and/or edges, for example, recessed area 70 may comprise a concave surface with an inward curvature and no well-defined edges. In some examples, the recess area 70 may comprise a defined top edge but not have defined side or bottom edges. In some examples, the recessed area 70 may comprise vertical or horizontal grooves, holes, or dimples that may promote better adherence of the hardfacing composite material to the matrix bit body. In some examples, the grooves, holes, or dimples may be about 1/16" to about 1/2" deep. The shape of the displacement insert 60 described in FIG. 3 determines the shape of the recessed area 70 to be formed.

Figure 5:
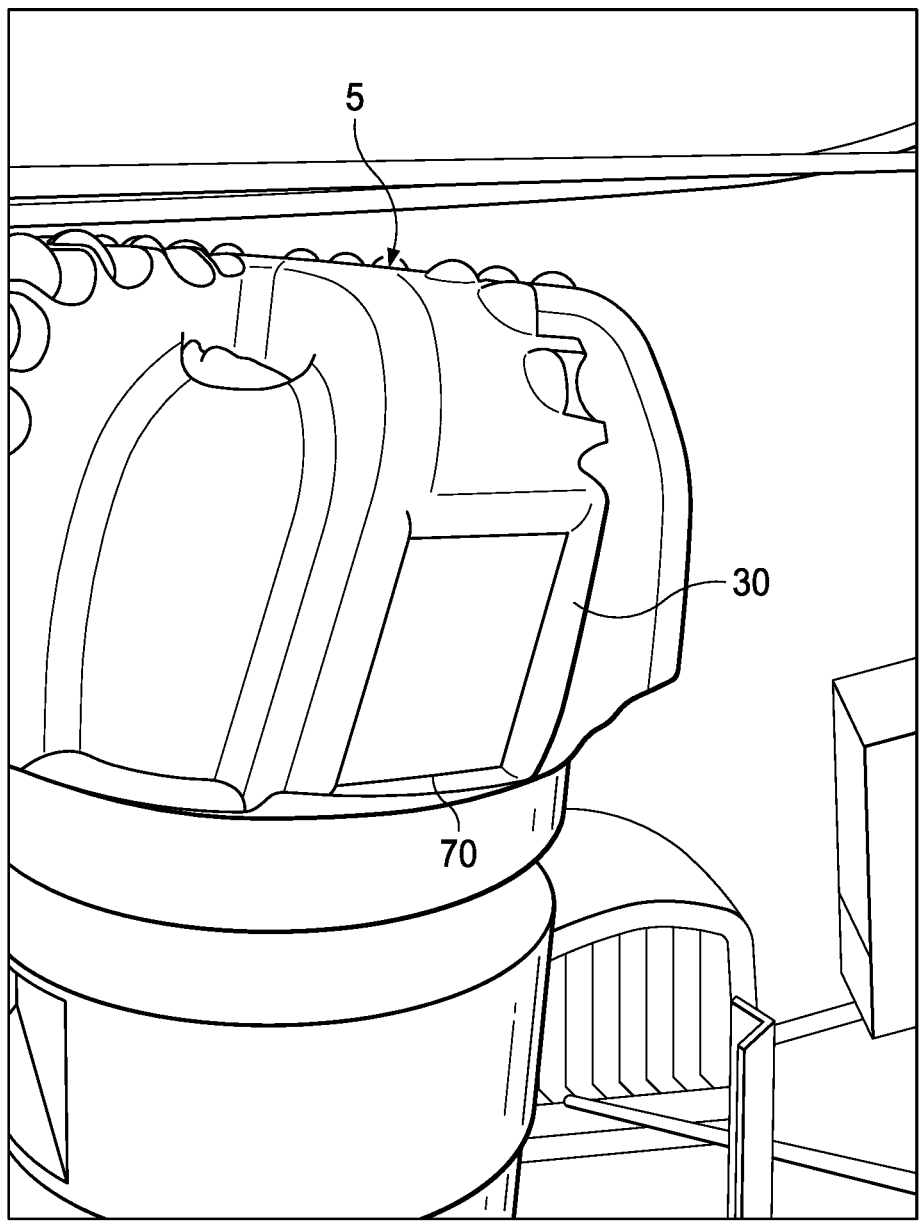
FIG. 5 is a photograph of a matrix bit body with a recessed area formed in the gauge pads as described above and as illustrated by FIG. 4 in accordance with certain examples of the present disclosure.

FIG. 5 is a photograph of a matrix bit body 5 with a recessed area 70 formed in the gauge pads 30 as described above and as illustrated by FIG. 4. The recessed area 70 was formed with a polygonal shaped graphite displacement insert (e.g., displacement insert 60 as discussed above). It is to be understood that any shape of displacement insert 60 may be used to provide a recessed area 70 of corresponding shape as desired.

Referring again to FIG. 4, once a recessed area 70 has been formed, the hardfacing composite material used for hardfacing may be applied to the recessed area and hardfaced to form hardfaced exterior surfaces (e.g., hardfaced exterior surface 35 as illustrated in FIG. 1) on the gauge pads 30. For example a preformed hardfacing element (e.g., preformed hardfacing element 45 as illustrated in FIG. 2) may be affixed to the recessed area 70 using an adhesive, clay, or sufficient adhering material, and then a hardfacing process may be performed. The hardfacing of the gauge pads 30 may be performed by any suitable hardfacing process including, but not limited to, oxyfuel welding, shielded metal arc welding, gas metal arc welding, submerged arc welding, plasma transferred arc welding, thermal spraying, laser cladding, and the like. In preferred examples, oxyfuel welding may be used to hardface the gauge pads 30 with the hardfacing composite material. It is to be understood that the hardfaced exterior surfaces formed on the recessed areas 70 may be modified as desired after the hardfacing process has been completed. Such modification may be performed to adjust the dimensions of the gauge of the fixed-cutter matrix bit 65. For example, the hardfaced exterior surfaces may be grinded or machined to a desired dimension to provide a wellbore of desired diameter.

Figure 6:
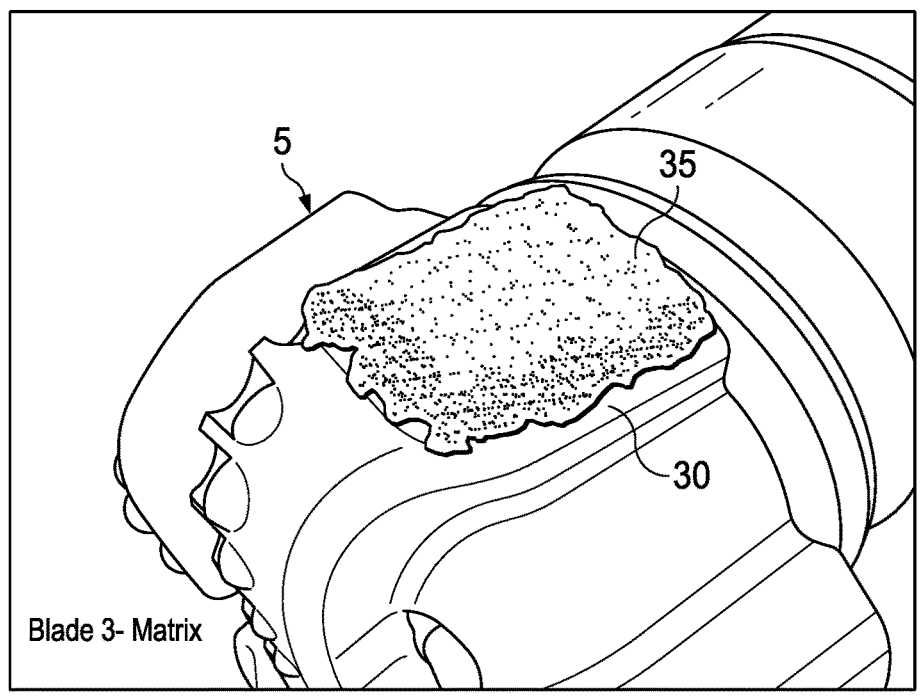
FIG. 6 is a photograph of the matrix bit body illustrated in FIG. 5 with hardfaced exterior surfaces on the gauge pads in accordance with certain examples of the present disclosure.

FIG. 6 is a photograph of the matrix bit body 5 illustrated in FIG. 5 with hardfaced exterior surfaces 35 on the gauge pads 30 as described above. The hardfacing composite material was attached as a preformed hardfacing element (e.g., preformed hardfacing element 45 as illustrated in FIG. 2) of sufficient dimensions and shape to the recessed area 70 (obscured by the hardfaced exterior surfaces 35), and oxyfuel welding was performed to form the hardfaced exterior surfaces 35 on the gauge pads 30.

Figure 7:
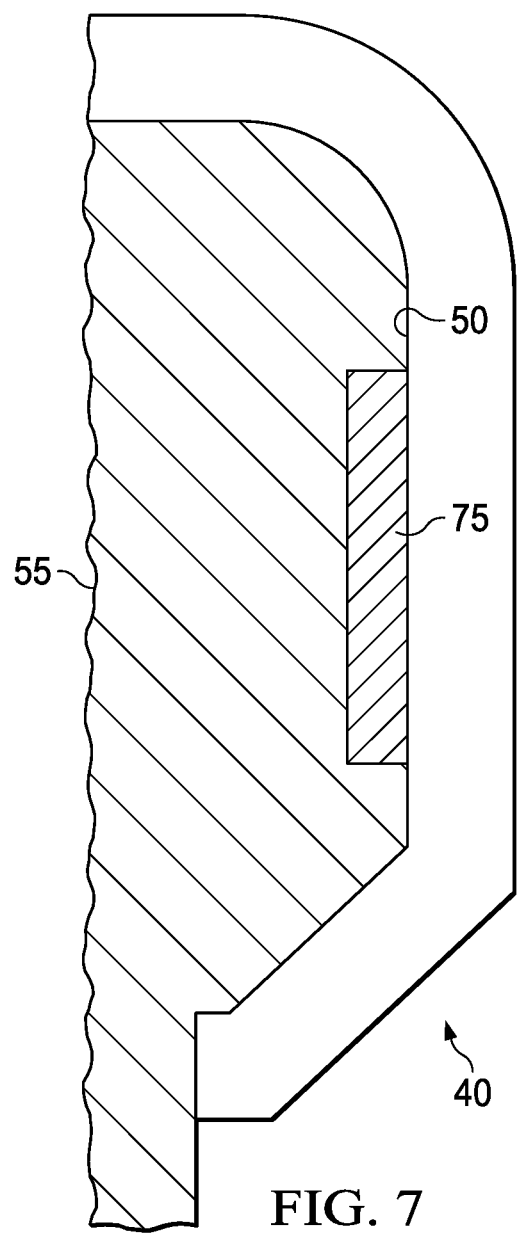
FIG. 7 is a cross-sectional view of a mold comprising a steel insert and is usable to manufacture a matrix bit body which may be used to form the fixed-cutter matrix bit illustrated in FIG. 1 in accordance with certain examples of the present disclosure.

FIG. 7 is a cross-sectional view of a mold 40 comprising a steel insert 75. The mold 40 is usable to manufacture a matrix bit body (e.g., matrix bit body 5 as illustrated in FIG. 1) which may then be used to form the fixed-cutter matrix bit 1 as illustrated in FIG. 1. The mold 40 comprises a steel insert 75 positioned at the portion of the mold 40 corresponding to where the gauge pad (e.g., gauge pad 30 as illustrated in FIG. 1) is to be positioned on the blade (e.g., a blade 20 as illustrated in FIG. 1). Unlike the displacement insert 60 illustrated in FIG. 3, the steel insert 75 may fuse with the matrix powder material 55 during the infiltration process, and the steel insert 75 may not be removed from the matrix bit body after the matrix bit body is removed from the mold 40. Without limitation, the steel insert 75 may comprise any alloy compatible with the matrix powder material 55 and sufficient for hardfacing applications on its exterior surface. Without limitation, other materials may also be used with the steel insert 75 to form a desired alloy, for example, stainless steel, molybdenum, nickel, copper, etc. In some examples, the steel insert 75 may comprise vertical or horizontal grooves, holes, or dimples on one or both faces to promote better adherence of the steel insert 75 to the matrix bit body and the hardfacing composite material to the steel insert 75. In some examples, the grooves, holes, or dimples may be about 1/16" to about 1/2" deep. The steel insert 75 may be affixed to the mold 40 using adhesive, clay, or any other sufficient material. The steel insert 75 may be adhered to a displacement insert (e.g., displacement insert 60 as illustrated in FIG. 3) to position the steel insert in the mold 40. The displacement insert may be placed against the interior surface 50 of the mold 40 or may be adhered directly to the interior surface 50 of the mold 40. If a displacement insert is used, the displacement insert may comprise graphite or a similar material that does not fuse to the steel insert 75. The displacement insert may also be formed into the mold directly. With the steel insert 75 in place, the matrix powder material 55 may then be placed into the mold 40 as illustrated to manufacture the matrix bit body. The matrix bit body may then be formed during the subsequent infiltration process. The completed matrix bit body may then be removed from mold 40. The steel insert 75 may have fused to the matrix composite material (i.e. the infiltrated matrix powder material 55) during the infiltration process. Hardfacing operations as described above may then be used to create a hardfaced exterior surface (e.g., hardfaced exterior surface 35 as illustrated in FIG. 1) on the exterior surface of the steel insert 75. It is to be understood that the hardfaced exterior surfaces formed on the exterior of the steel insert 75 may be modified as desired after the matrix bit body has been manufactured. Such modification may be performed to adjust the dimensions of the gauge of the fixed-cutter matrix bit. For example, the hardfaced exterior surfaces may be grinded or machined to a desired dimension to provide a wellbore of desired diameter.

Figure 8:
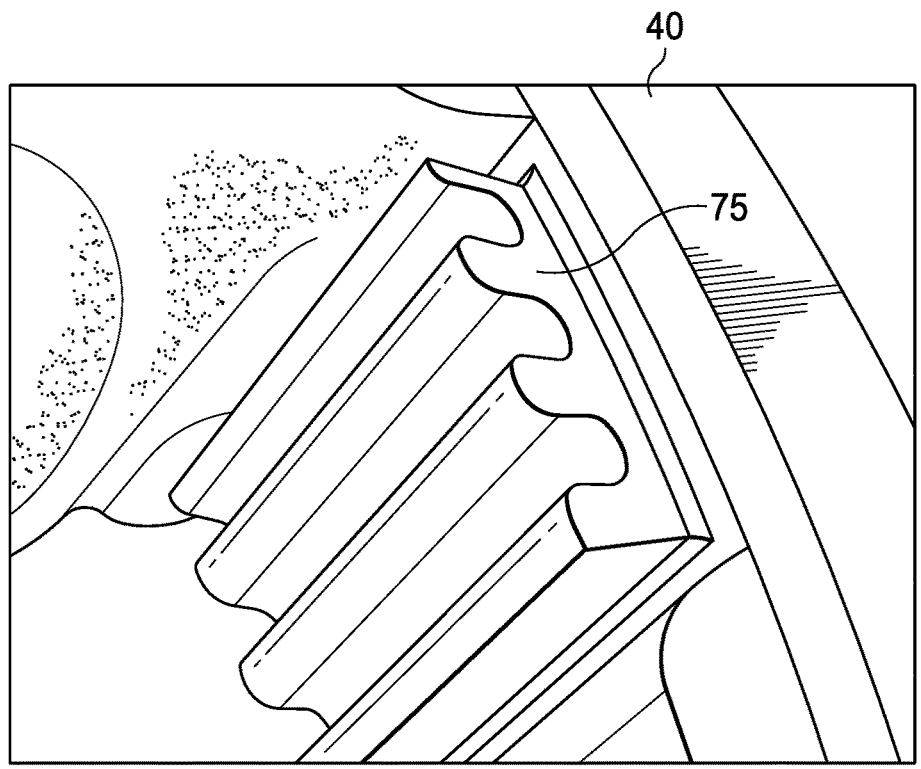
FIG. 8 is a photograph of the mold of FIG. 7 with the steel insert positioned inside the mold at the portion of the mold corresponding to where the gauge pad (e.g., gauge pad is to be positioned on the matrix bit body in accordance with certain examples of the present disclosure.

FIG. 8 is a photograph of the mold 40 as described above with the steel insert 75 positioned inside the mold 40 at the portion of the mold 40 corresponding to where the gauge pad (e.g., gauge pad 30 as illustrated in FIG. 1) is to be positioned on the blade (e.g., a blade 20 as illustrated in FIG. 1) when the matrix bit body (e.g., matrix bit body 5 as illustrated in FIG. 1) is formed. The steel insert 75 may become fused with the matrix composite material (i.e. the infiltrated matrix powder material 55 as illustrated in FIG. 7) during infiltration.

In all examples described herein, repair operations may be conducted on the hardfaced exterior surfaces (e.g., hardfaced exterior surfaces 35 as illustrated in FIG. 1) if the hardfaced exterior surfaces become worn or damaged. The repair operations may be performed by adding additional or replacement hardfacing composite material to the hardfaced exterior surface of the gauge pads and fusing the two using a hardfacing metalworking process including, but not limited to, oxyfuel welding, shielded metal arc welding, gas metal arc welding, submerged arc welding, plasma transferred arc welding, thermal spraying, laser cladding, and the like. In preferred examples, oxyfuel welding may be used to repair the hardfaced exterior surface of the gauge pads.

In optional examples, reinforcement materials comprising tungsten carbide substrates may be added to the gauge pads (e.g., gauge pads 30 as illustrated in FIG. 1) or a preformed hardfacing element (e.g., preformed hardfacing element 45 as illustrated in FIG. 2) prior to the hardfacing operation. The reinforcement materials may be any material that the hardfacing may bond. The reinforcement materials may include, but are not limited to, tungsten carbide inserts, tungsten carbide brick, and polycrystalline diamond domes.

Figure 9:
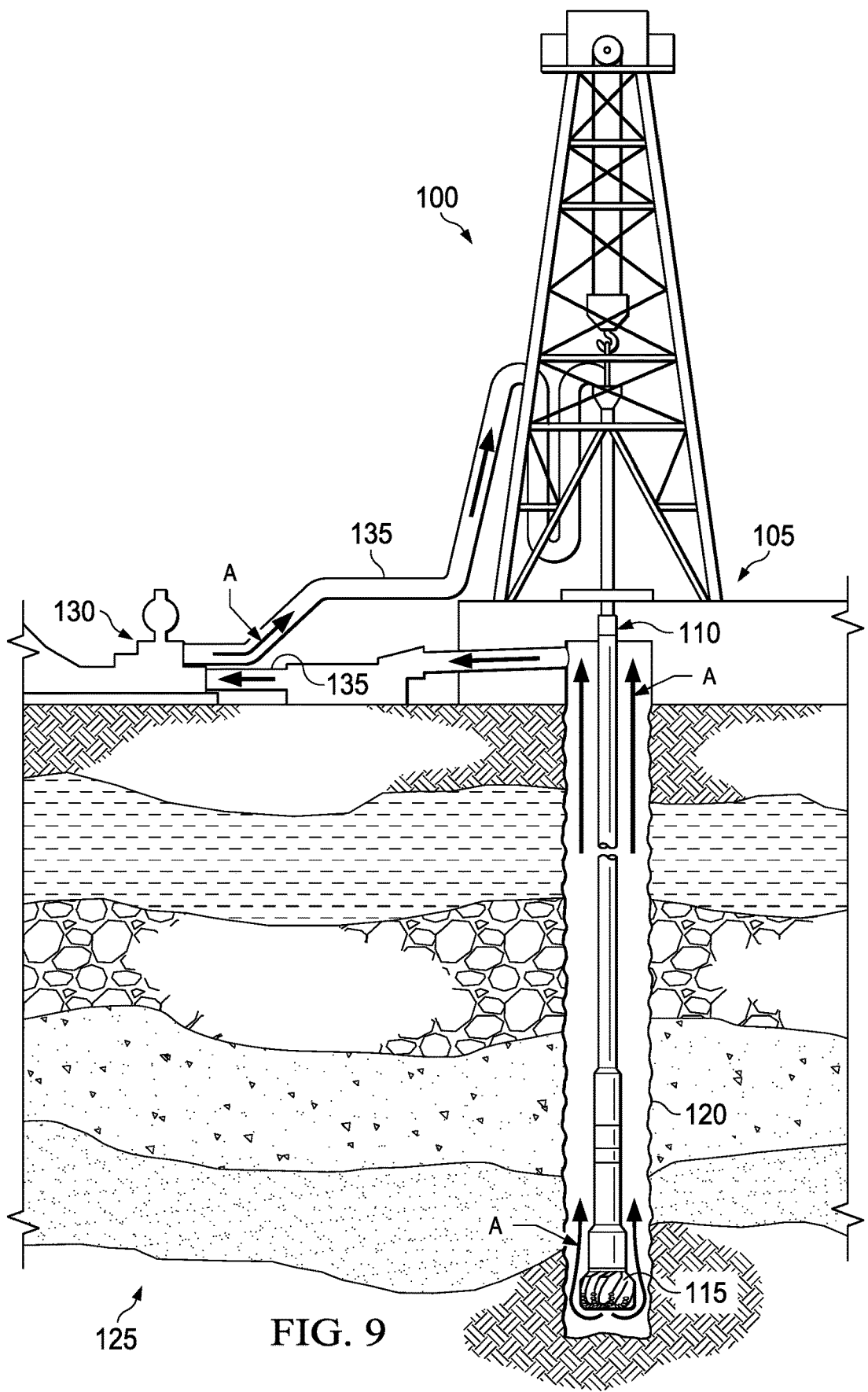
FIG. 9 is a schematic showing one example of a drilling assembly suitable for use in conjunction with the fixed-cutter matrix bits of the present disclosure.

FIG. 9 is a schematic showing one example of a drilling assembly 100 suitable for use in conjunction with the fixed-cutter matrix bits of the present disclosure. It should be noted that while FIG. 9 generally depicts a land-based drilling assembly, those skilled in the art will readily recognize that the principles described herein are equally applicable to subsea drilling operations that employ floating or sea-based platforms and rigs, without departing from the scope of the disclosure.

The drilling assembly 100 includes a drilling platform 105 coupled to a drill string 110. The drill string 110 may include, but is not limited to, drill pipe and coiled tubing, as generally known to those skilled in the art apart from the particular teachings of this disclosure. A fixed-cutter matrix bit 115 according to the examples described herein is attached to the distal end of the drill string 110 and is driven either by a downhole motor and/or via rotation of the drill string 110 from the well surface. As the fixed-cutter matrix bit 115 rotates, it creates a wellbore 120 that penetrates the subterranean formation 125. The drilling assembly 100 also includes a pump 130 that circulates a drilling fluid through the drill string (as illustrated as flow arrows A) and other pipes 135.

One skilled in the art would recognize the other equipment suitable for use in conjunction with drilling assembly 100, which may include, but is not limited to, retention pits, mixers, shakers (e.g., shale shaker), centrifuges, hydrocyclones, separators (including magnetic and electrical separators), desilters, desanders, filters (e.g., diatomaceous earth filters), heat exchangers, and any fluid reclamation equipment. Further, the drilling assembly 100 may include one or more sensors, gauges, pumps, compressors, and the like.

Figure 10:
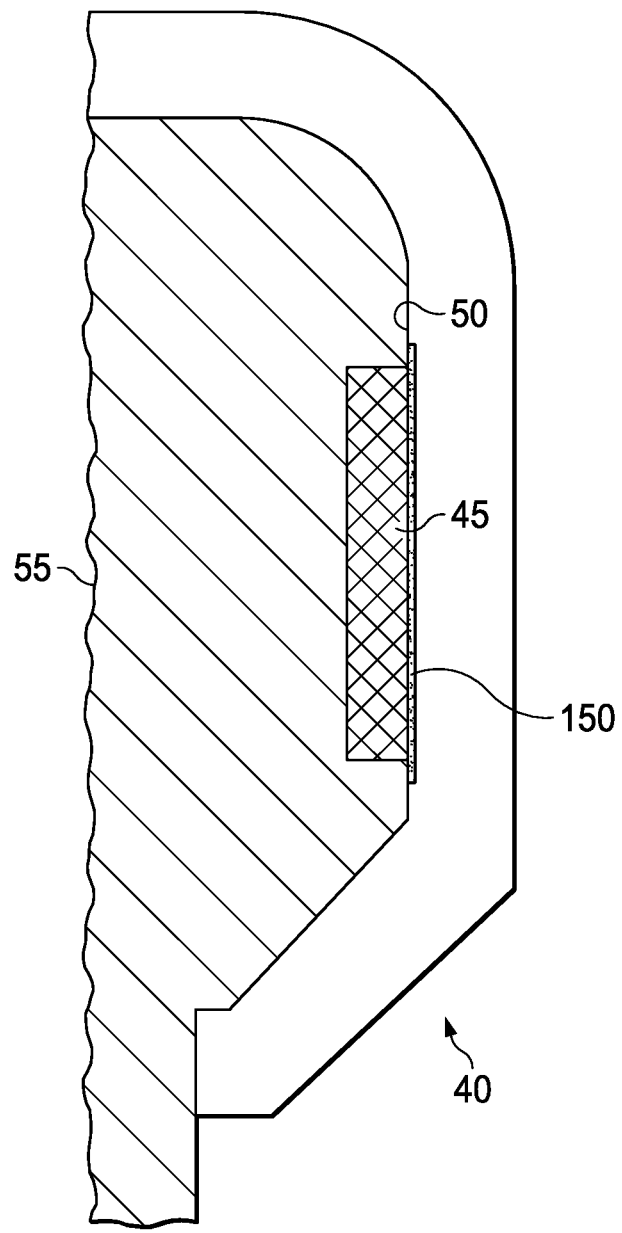
FIG. 10 is a cross-sectional view of a mold comprising a preformed hardfacing element as affixed to positional insert in accordance with certain examples of the present disclosure.

FIG. 10 is a cross-sectional view of a mold 40 comprising a preformed hardfacing element 45. The mold 40 is usable to manufacture a matrix bit body (e.g., matrix bit body 5 as illustrated in FIG. 1) which may then be used to form the fixed-cutter matrix bit 1 illustrated in FIG. 1. The illustrated cross-sectional portion of the mold 40 corresponds generally to the portion of the fixed-cutter matrix bit where a blade may be formed (e.g., a blade 25 as illustrated in FIG. 1). A preformed hardfacing element 45 is placed into the mold 40 at the portion of the mold 40 corresponding to where the gauge pad (e.g., gauge pad 30 as illustrated in FIG. 1) is to be positioned on the blade. The preformed hardfacing element 45 is adhered to a positioning insert 150 placed against the interior surface 50 of the mold 40. The positioning insert 150 may comprise graphite, sand, or a similar material that does not fuse to the preformed hardfacing element 45. In some examples, the positioning insert 150 may be formed directly into the mold. The matrix powder material 55, which may be a tungsten carbide powder, is then placed into the mold 40 as is done typically when manufacturing a matrix bit body. During the subsequent infiltration process, the molten infiltration binder may then be used to fuse the preformed hardfacing element 45 to the matrix composite material (i.e., the infiltrated matrix powder material 55) which forms the matrix bit body. The completed matrix bit body comprising gauge pads with hardfaced exterior surfaces (e.g., hardfaced exterior surfaces 35 as illustrated in FIG. 1) may then be removed from mold 40.

Provided are fixed-cutter matrix bits in accordance with the description provided herein and as illustrated by FIGS. 1-9. An example fixed-cutter matrix bit comprises a matrix bit body, a plurality of cutter elements secured at fixed locations to the matrix bit body, and a plurality of gauge pads disposed on the matrix bit body; wherein at least one of the gauge pads includes a hardfaced exterior surface. The hardfaced exterior surface may comprise a material selected from the group consisting of tungsten, niobium, vanadium, molybdenum, silicon, titanium, tantalum, zirconium, chromium, yttrium, boron, carbon, carbides thereof, nitrides thereof, borides thereof, oxides thereof, silicides thereof, and combinations thereof. The hardfaced exterior surface may be fused to the at least one gauge pad during the infiltration process of manufacturing the matrix bit body. The hardfaced exterior surface may be hardfaced on to a recessed area on the at least one gauge pad. The hardfaced exterior surface may be hardfaced on to a steel insert fused to the at least one gauge pad. The at least one gauge pad may not comprise thermally stable polycrystalline diamond elements. The hardfaced exterior surface may be repaired at least once by a hardfacing process used to apply an additional hardfacing composite material to the hardfaced exterior surface.

Provided are methods for adding a hardfaced exterior surface to a fixed-cutter matrix bit in accordance with the description provided herein and as illustrated by FIGS. 1-9. An example method comprises providing a mold for a fixed-cutter matrix bit, wherein the mold comprises an area corresponding to where at least one gauge pad may be formed; adding an insert to the area of the mold corresponding to where the at least one gauge pad may be formed, wherein the insert is selected from the group consisting of a preformed hardfacing element, a displacement insert, a steel insert; adding a matrix powder material to the mold; performing an infiltration process by introducing an infiltration binder to the mold, wherein the infiltration process forms the matrix bit body of the fixed-cutter matrix bit in the mold; and removing the matrix bit body from the mold. If the preformed hardfacing element was selected, the preformed hardfacing element may be fused to the gauge pad of the matrix bit body during the infiltration process to form a hardfaced exterior surface. The preformed hardfacing element may comprise a material selected from the group consisting of tungsten, niobium, vanadium, molybdenum, silicon, titanium, tantalum, zirconium, chromium, yttrium, boron, carbon, carbides thereof, nitrides thereof, borides thereof, oxides thereof, silicides thereof, and combinations thereof. If the displacement insert is selected, the displacement insert may be separated from the matrix bit body to expose a recessed area in the gauge pad of the matrix bit body, and a hardfacing process may be used to hardface a hardfacing composite material to the recessed area to form a hardfaced exterior surface on the recessed area. If the steel insert was selected, the method may further comprise using a hardfacing process to hardface a hardfacing composite material to the exterior of the steel insert to form a hardfaced exterior surface on the exterior of the steel insert. The hardfacing process may be selected from the group consisting of oxyfuel welding, shielded metal arc welding, gas metal arc welding, submerged arc welding, plasma transferred arc welding, thermal spraying, laser cladding, and combinations thereof. The method may further comprise repairing the hardfaced exterior surface at least once by using a hardfacing process to hardface an additional hardfacing composite material to the hardfaced exterior surface.

The at least one gauge pad of the matrix bit body may not comprise thermally stable polycrystalline diamond elements.

Provided are drilling assemblies for drilling a wellbore in accordance with the description provided herein and as illustrated by FIGS. 1-9. An example drilling assembly comprises a drill string extendable from a drilling platform and into a wellbore; a pump fluidly connected to the drill string and configured to circulate a drilling fluid into the drill string and through the wellbore; and a fixed-cutter matrix bit coupled to an end of the drill string, the fixed-cutter matrix bit having a matrix bit body and a plurality of cutting elements coupled to an exterior portion of the matrix bit body, and wherein the matrix bit body comprises at least one gauge pad having a hardfaced exterior surface. The hardfaced exterior surface may comprise a material selected from the group consisting of tungsten, niobium, vanadium, molybdenum, silicon, titanium, tantalum, zirconium, chromium, yttrium, boron, carbon, carbides thereof, nitrides thereof, borides thereof, oxides thereof, silicides thereof, and combinations thereof. The hardfaced exterior surface may be fused to the at least one gauge pad during the infiltration process of manufacturing the matrix bit body. The hardfaced exterior surface may be hardfaced on to a recessed area on the at least one gauge pad. The hardfaced exterior surface may be hardfaced on to a steel insert fused to the at least one gauge pad. The at least one gauge pad may not comprise thermally stable polycrystalline diamond elements. The hardfaced exterior surface may be repaired at least once by a hardfacing process used to apply an additional hardfacing composite material to the hardfaced exterior surface.

Therefore, the disclosed systems and methods are well adapted to attain the ends and advantages mentioned, as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown other than as described in the claims below. It is therefore evident that the particular illustrative embodiments disclosed above may be altered, combined, or modified, and all such variations are considered within the scope of the present disclosure. The systems and methods illustratively disclosed herein may suitably be practiced in the absence of any element that is not specifically disclosed herein and/or any optional element disclosed herein.

Although the present disclosure and its advantages have been described in detail, it should be understood that various changes, substitutions and alterations can be made herein without departing from the spirit and scope of the disclosure as defined by the following claims.

What is claimed is:

1. A fixed-cutter matrix bit comprising:
    a matrix bit body,
    a plurality of cutter elements secured at fixed locations to the matrix bit body, and
    a plurality of gauge pads disposed on the matrix bit body proximate to at least one cutter element; wherein at least one of the gauge pads includes a hardfaced exterior surface,
    wherein the hardfaced exterior surface was fused to the at least one gauge pad during an infiltration process performed to manufacture the matrix bit body by adhering a preformed hardfacing element to a positioning insert placed against an interior surface of a mold for the matrix bit body.

2. The fixed-cutter matrix bit of claim 1, wherein the hardfaced exterior surface comprises a material selected from the group consisting of tungsten, niobium, vanadium, molybdenum, silicon, titanium, tantalum, zirconium, chromium, yttrium, boron, carbon, carbides thereof, nitrides thereof, borides thereof, oxides thereof, silicides thereof, and combinations thereof.

3. The fixed-cutter matrix bit of claim 1, wherein a second gauge pad further comprises a recessed area and wherein a second hardfaced exterior surface is hardfaced on to the recessed area.

4. The fixed-cutter matrix bit of claim 1, wherein a second gauge pad further comprises a steel insert fused to its exterior, and wherein a second hardfaced exterior surface was hardfaced on to the steel insert.

5. The fixed-cutter matrix bit of claim 1, wherein the at least one gauge pad does not comprise thermally stable polycrystalline diamond elements.

6. The fixed-cutter matrix bit of claim 1, wherein an additional hardfacing composite material is hardfaced to the hardfaced exterior surface.

7. A method for adding a hardfaced exterior surface to a fixed-cutter matrix bit:
    providing a mold for a fixed-cutter matrix bit, wherein the mold comprises an area corresponding to where at least one gauge pad may be formed wherein the area is proximate to a cutter element of the fixed-cutter matrix bit;
    adhering a preformed hardfacing element to a positioning insert positioned on an inside area of the mold corresponding to where the at least one gauge pad may be formed,
    adding a matrix powder material to the mold;
    performing an infiltration process by introducing an infiltration binder to the mold, wherein the infiltration process forms a matrix bit body of the fixed-cutter matrix bit in the mold; wherein the preformed hardfacing element is fused to the at least one gauge pad during the infiltration process to form a hardfaced exterior surface, and
    removing the matrix bit body from the mold.

8. The method of claim 7, wherein the preformed hardfacing element comprises a material selected from the group consisting of tungsten, niobium, vanadium, molybdenum, silicon, titanium, tantalum, zirconium, chromium, yttrium, boron, carbon, carbides thereof, nitrides thereof, borides thereof, oxides thereof, silicides thereof, and combinations thereof.

9. The method of claim 7, further comprising adding a displacement insert to the mold corresponding to where a second gauge pad may be formed, and separating the displacement insert from the matrix bit body to expose a recessed area in the gauge pad of the matrix bit body, and using a hardfacing process to hardface a hardfacing composite material to the recessed area to form a second hardfaced exterior surface on the recessed area.

10. The method of claim 9, wherein the hardfacing process is selected from the group consisting of oxyfuel welding, shielded metal arc welding, gas metal arc welding, submerged arc welding, plasma transferred arc welding, thermal spraying, laser cladding, and combinations thereof.

11. The method of claim 7, further comprising repairing the hardfaced exterior surface at least once by using a hardfacing process to hardface an additional hardfacing composite material to the hardfaced exterior surface.

12. The method of claim 7, further comprising adding a steel insert to the mold corresponding to where a second gauge pad may be formed, and using a hardfacing process to hardface a hardfacing composite material to an exterior of the steel insert to form a second hardfaced exterior surface on the exterior of the steel insert.

13. The method of claim 12, wherein the hardfacing process is selected from the group consisting of oxyfuel welding, shielded metal arc welding, gas metal arc welding, submerged arc welding, plasma transferred arc welding, thermal spraying, laser cladding, and combinations thereof.

14. The method of claim 7, wherein the at least one gauge pad of the matrix bit body does not comprise thermally stable polycrystalline diamond elements.

15. A drilling assembly comprising:
a drill string extendable from a drilling platform and into a wellbore;
a pump fluidly connected to the drill string and configured to circulate a drilling fluid into the drill string and through the wellbore; and
a fixed-cutter matrix bit coupled to an end of the drill string, the fixed-cutter matrix bit having a matrix bit body and a plurality of cutting elements coupled to an exterior portion of the matrix bit body, wherein the matrix bit body comprises at least one gauge pad having a hardfaced exterior surface proximate to at least one cutter element, and wherein the hardfaced exterior surface was fused to the at least one gauge pad during an infiltration process performed to manufacture the matrix bit body by adhering a preformed hardfacing element to a positioning insert placed against an interior surface of a mold for the matrix bit body.

16. The drilling assembly of claim 15, wherein the hardfaced exterior surface comprises a material selected from the group consisting of tungsten, niobium, vanadium, molybdenum, silicon, titanium, tantalum, zirconium, chromium, yttrium, boron, carbon, carbides thereof, nitrides thereof, borides thereof, oxides thereof, silicides thereof, and combinations thereof.

17. The drilling assembly of claim 15, wherein the at least one gauge pad does not comprise thermally stable polycrystalline diamond elements.

18. The drilling assembly of claim 15, wherein a second gauge pad further comprises a recessed area and wherein a second hardfaced exterior surface is hardfaced on to the recessed area.

19. The drilling assembly of claim 15, wherein a second gauge pad further comprises a steel insert fused to its exterior, and wherein a second hardfaced exterior surface was hardfaced on to the steel insert.

20. The drilling assembly of claim 15, wherein the hardfaced exterior surface has an additional hardfacing composite material hardfaced to the hardfaced exterior surface after completion of the infiltration process.

* * * * *